(12) United States Patent
Fabien (10) Patent No.: US 7,826,957 B2
(45) Date of Patent: Nov. 2, 2010

(54) ENGINE CONTROL RESPONSIVE TO VARYING AMOUNTS OF ALCOHOL IN FUEL

(75) Inventor: Phil Andrew Fabien, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 18 days.

(21) Appl. No.: 12/359,937

(22) Filed: Jan. 26, 2009

(65) Prior Publication Data
US 2010/0191439 A1 Jul. 29, 2010

(51) Int. Cl.
*F02D 31/00* (2006.01)
*F02M 63/02* (2006.01)

(52) U.S. Cl. .................. 701/103; 701/110; 123/351; 123/575; 123/332

(58) Field of Classification Search .............. 123/1 A, 123/332–333, 198 D, 198 F, 481, 575, 350–352, 123/377, 381, 494; 701/101, 103–110, 112, 701/114–115
See application file for complete search history.

(56) References Cited

U.S. PATENT DOCUMENTS

| | | | | |
|---|---|---|---|---|
| 4,677,878 A * | 7/1987 | Yamamori et al. | ............ | 477/48 |
| 4,913,099 A * | 4/1990 | Ota | ............ | 123/478 |
| 4,957,087 A * | 9/1990 | Ota | ............ | 123/479 |
| 4,967,714 A * | 11/1990 | Inoue | ............ | 123/694 |
| 4,982,709 A * | 1/1991 | Oota | ............ | 123/339.12 |
| 5,056,490 A * | 10/1991 | Kashima | ............ | 123/478 |
| 5,088,350 A * | 2/1992 | Kurihara et al. | ............ | 477/120 |
| 5,131,228 A | 7/1992 | Mochizuki et al. | | |
| 5,167,169 A * | 12/1992 | Saito et al. | ............ | 477/62 |
| 5,186,149 A * | 2/1993 | Kitajima et al. | ............ | 123/491 |
| 5,191,869 A * | 3/1993 | Kamioka et al. | ............ | 123/494 |
| 5,253,631 A * | 10/1993 | Curran | ............ | 123/696 |
| 6,851,416 B1 * | 2/2005 | DeWitte et al. | ............ | 123/575 |
| 7,047,940 B2 | 5/2006 | Niimi | | |
| 7,168,408 B2 | 1/2007 | Toda | | |
| 7,280,910 B2 | 10/2007 | Miyamoto et al. | | |
| 7,404,397 B2 * | 7/2008 | Dobeck | ............ | 123/672 |
| 7,454,285 B2 * | 11/2008 | Christie et al. | ............ | 701/105 |
| 7,474,955 B2 * | 1/2009 | Wittefeldt et al. | ............ | 701/109 |
| 7,549,408 B2 * | 6/2009 | Russell | ............ | 123/481 |
| 7,600,503 B2 * | 10/2009 | Russell | ............ | 123/481 |
| 7,621,257 B1 * | 11/2009 | Leone et al. | ............ | 123/431 |
| 7,641,587 B2 * | 1/2010 | Jess et al. | ............ | 477/97 |
| 7,673,613 B2 * | 3/2010 | Yamashita | ............ | 123/399 |
| 2008/0072878 A1 | 3/2008 | Kokubu | | |
| 2008/0120008 A1 * | 5/2008 | Russell | ............ | 701/102 |
| 2009/0210135 A1 * | 8/2009 | Miyata et al. | ............ | 701/103 |
| 2009/0248279 A1 * | 10/2009 | Ito et al. | ............ | 701/109 |
| 2009/0277418 A1 * | 11/2009 | Leone et al. | ............ | 123/25 R |
| 2009/0314071 A1 * | 12/2009 | Mukai | ............ | 73/114.38 |
| 2010/0010726 A1 * | 1/2010 | Orikabe | ............ | 701/103 |

* cited by examiner

*Primary Examiner*—Thomas N Moulis
(74) *Attorney, Agent, or Firm*—Allan J. Lippa; Alleman Hall McCoy Russell & Tuttle LLP (57) ABSTRACT

Various systems and methods are described for operating an engine in a vehicle in response to fuel having varying amounts of alcohol. One example method comprises delivering fuel to the engine, limiting engine speed during vehicle operation to a maximum permitted engine speed, the maximum permitted engine speed responsive to the amount of alcohol in the fuel.

20 Claims, 6 Drawing Sheets

ENGINE CONTROL RESPONSIVE TO VARYING AMOUNTS OF ALCOHOL IN FUEL

FIELD

The present description relates to a method for controlling an internal combustion engine operating with a variety of fuels of varying composition and fuel delivery options.

BACKGROUND AND SUMMARY

Vehicle engines may be configured to operate on various fuel blends. Such vehicles, sometimes referred to as flex-fuel vehicles, may be configured to operate on gasoline, for example, with varying levels of ethanol, ranging from pure gasoline to E85 (85% ethanol and 15% gasoline).

However, the inventor herein has recognized a problem with engine degradation in vehicles operating consistently on higher alcohol fuels, such as E85. Specifically, engine main bearing fatigue has been observed during high speed durability testing while running with 85% ethanol blends, whereas the same engines have no bearing fatigue when running with gasoline only and tested at the same engine speeds. While it may be possible to change main bearing material to address this wear issue, this can increase manufacturing complexity and increase cost. Likewise, it may also be possible to change the recommended engine oil to address the wear issue, but such a change may decrease the vehicle fuel economy.

As such, in one approach, the above issue may be at least partially addressed by limiting the engine speed to a maximum permitted engine speed during vehicle operation responsive to the amount of alcohol.

In this way, it is possible to maintain common main bearing designs among gasoline and flex-fuel engine designs, maintain fuel economy, and further it is possible to address cost and manufacturing complexity while also accommodating various fuel types. However, it is also possible to apply the above approach in combination with changes to the main bearing material as well as changes to the recommended engine oil, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
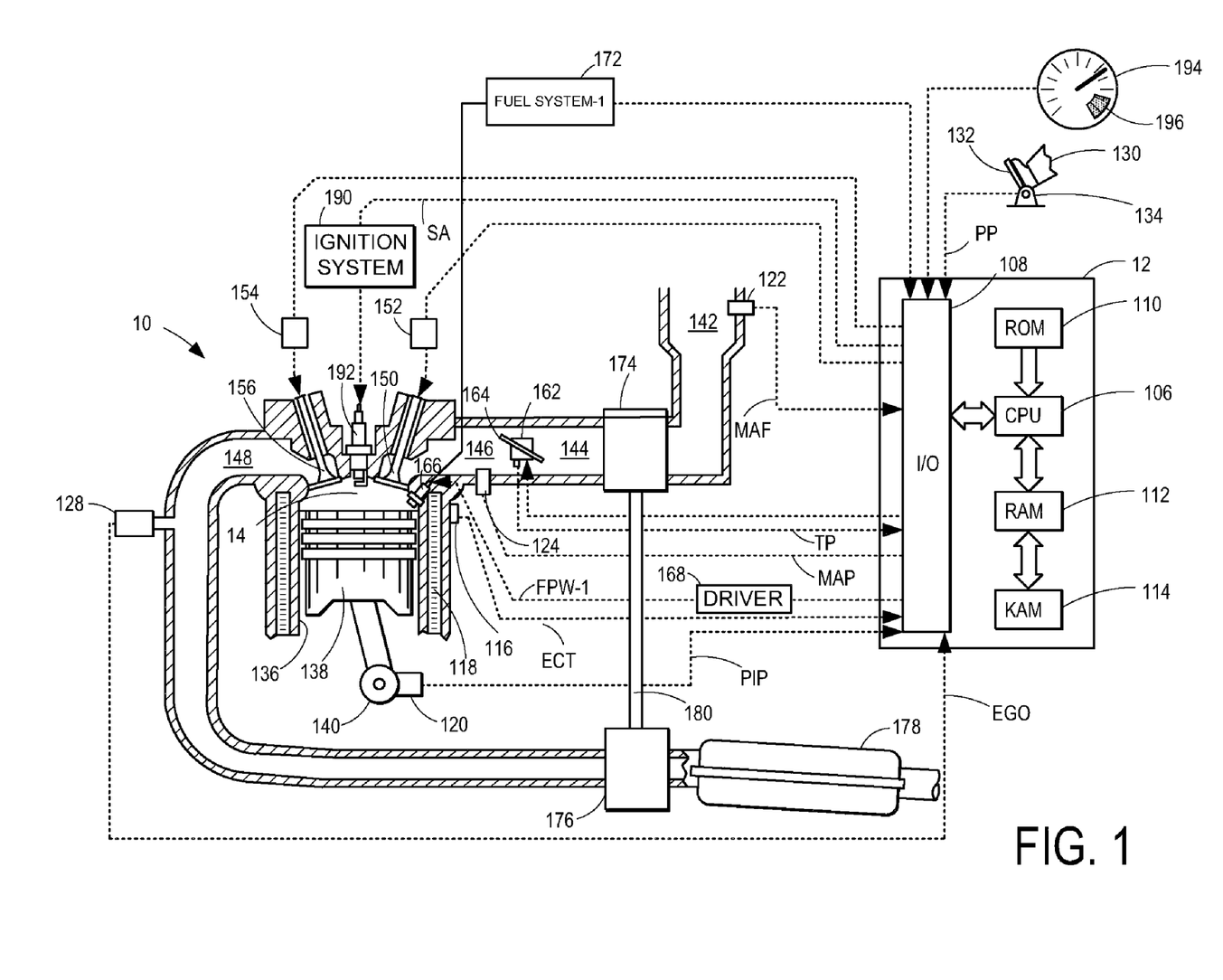
FIG. 1 shows an example embodiment of a combustion chamber.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a torque converter of a transmission system. The transmission system may be an automatic transmission. In another example, the engine may be coupled to a manual transmission. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a $NO_x$, HC, or CO sensor, for example. Emission control device 178 may be a three way catalyst (TWC), $NO_x$ trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including a fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

As described above, FIG. 1 shows only one cylinder of a multi-cylinder engine. As such each cylinder may similarly include its own set of intake/exhaust valves, fuel injector(s), spark plug, etc.

A fuel tank in fuel system 172 may hold fuel with different fuel qualities, such as different fuel compositions. These differences may include different alcohol content, different octane, different heats of vaporization, different fuel blends, and/or combinations thereof, etc.

Moreover, fuel characteristics of the fuel tank may vary frequently. In one example, a driver may refill fuel tank 172 with E85 one day, and E10 the next, and E50 the next. The day to day variations in tank refilling can thus result in frequently varying fuel compositions of the fuel in tank 172, thereby affecting the fuel compositions and/or fuel qualities delivered by injector 166. The differences in fuel composition and/or quality delivered to injector 166 may hereon be referred to as fuel type.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. A tachometer 194 may be used to display the engine RPM generated by controller 12 to the vehicle operator. The tachometer may include a red-line range 196 indicating a maximum engine operating speed. Manifold pressure signal MAP from a manifold pressure sensor may be used to provide an indication of vacuum, or pressure, in the intake manifold.

Engine 10 may further include a fuel vapor purging system (not shown) for storing and purging fuel vapors to the intake manifold of the engine via vacuum generated in the intake manifold.

Figure 2:
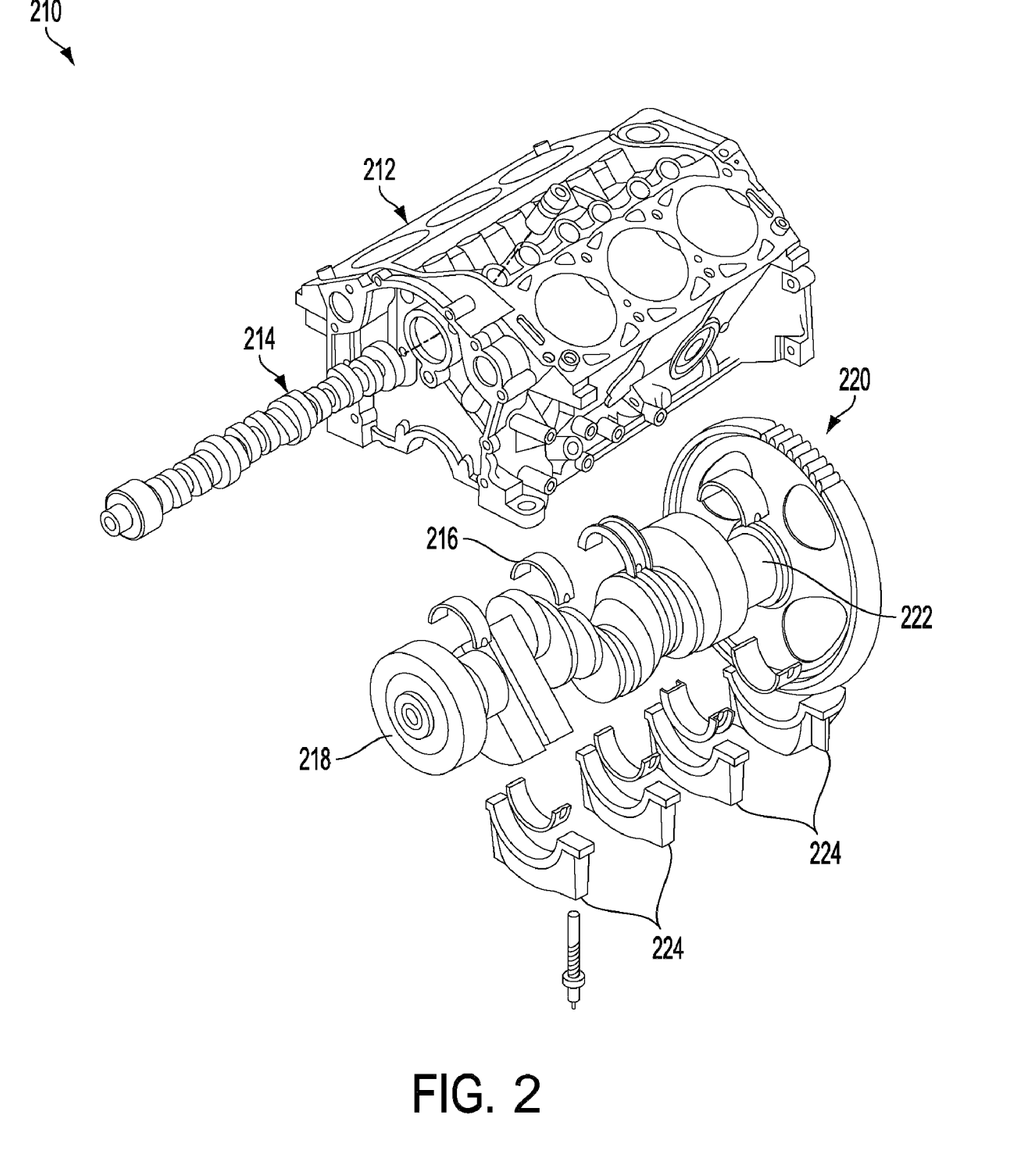
FIG. 2 shows an example embodiment of main engine bearings.

One example engine construction for engine 10 is shown in FIG. 2. Specifically, an example embodiment of main engine bearings 216 of an engine 210 is shown in FIG. 2. The main engine bearings 216, which allow crankshaft 222 to rotate freely, are contained in main bearing caps 224. Crankshaft 222 is mounted to the bottom of engine block 212 by the main bearing caps 224. Structural support is provided by engine block 212 to engine components including crankshaft 222 and camshaft 214, among others. The flywheel 220 and vibration damper 218, located at either end of the crankshaft 222, enable the crankshaft 222 to make smooth transitions between powerstrokes of the engine. Although engine 210 is shown with four main bearings 216, the number of main bearings is not limited to four. The number of bearings is dependent on the type of engine, for example, an I-6 engine may have three main bearings while an I-4 engine may have five main bearings.

A problem that may occur with main engine bearings is fatigue, and running an engine at high speeds may contribute to such bearing fatigue. Main bearing fatigue may be further increased at high speeds when the fuel contains a larger percentage of alcohol, such as ethanol (e.g., E85), as compared to gasoline, for example. One method to reduce such fatigue as described herein is to limit the speed of the engine under select conditions so that the engine operates less frequently at engine speeds above a high speed threshold. Limiting of the engine speed may be achieved via various methods, examples of which are described in detail below. In one approach, speed limiting includes cutting fuel injection to the engine. In another approach, speed limiting includes adjusting the throttle opening and, thus, the air flow to the engine. Responsive to the alcohol amount in the fuel, selected ranges of shift points of the transmission may also be adjusted.

Figure 3:
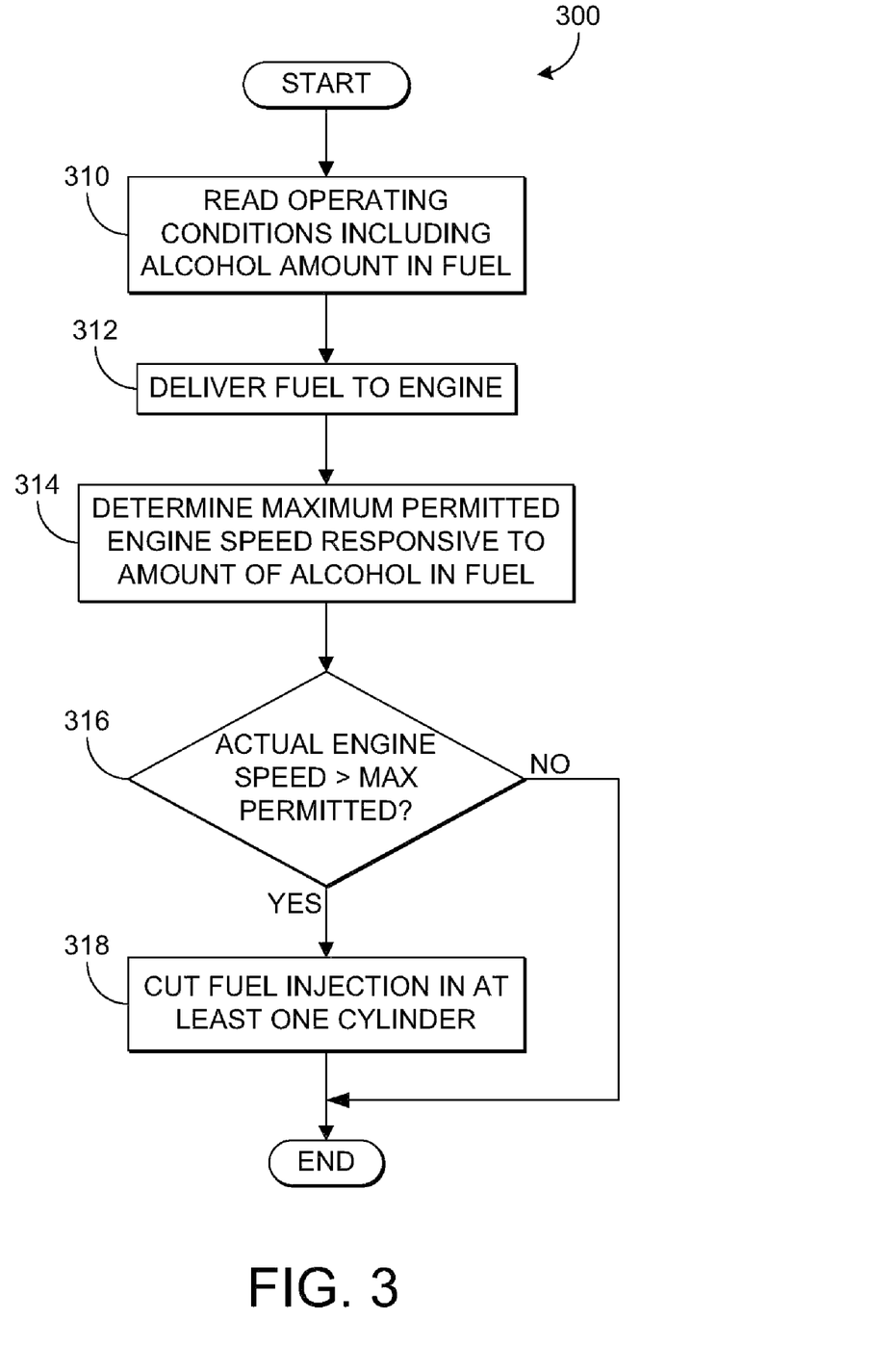
FIG. 3 is a flow chart illustrating an engine control system routine for an absolute speed limit.

FIG. 3 shows a flow chart illustrating a control system routine 300 for an absolute upper speed limit of the engine. Specifically, the procedure determines the absolute upper speed limit (referred to herein as a hard speed limit) of the engine based on an amount of alcohol contained in the fuel and accordingly adjusts fuel injection depending on the speed limit of the engine. In one example, this maximum permitted upper engine speed is reduced as the amount of alcohol in the fuel increases. In this manner, the control system responds to engine operation in the red-line speed range differently for varying amounts of alcohol in the fuel and, thus, main bearing fatigue may be reduced. In one particular example, the maximum permitted upper engine speed limit at lower alcohol fuel amounts may be in an upper region of the red-line speed range, whereas the maximum permitted upper engine speed limit at higher alcohol fuel amounts may be in a lower region of the red-line speed range.

At 310 of routine 300, the engine operating conditions, including the amount of alcohol in the fuel, are read. The amount of alcohol (e.g., ethanol) may be measured in a variety of locations. In one example, the amount of alcohol in the fuel may be a percent of ethanol measured in the fuel tank. In another example, the amount of alcohol may be a percent of ethanol delivered to the combustion chamber. In some embodiments, the control system may include instructions for determining the amount of alcohol in the fuel based on conditions such as air fuel ratio, amount of fuel injected, and airflow, for example.

After the amount of alcohol in the fuel is determined, fuel is delivered to the engine at 312 of routine 300. In some embodiments, as described above, the fuel may be delivered to the combustion chamber via direct injection. In other embodiments, the fuel injector may be provided at the intake passage of the cylinder; thus, fuel is delivered to the intake passage (i.e., port fuel injection, PFI).

At 314, the upper maximum permitted engine speed, or hard speed limit, is determined. The upper maximum engine speed is dependent on the amount of alcohol in the fuel. For example, if the fuel is 100% gasoline, the hard speed limit corresponding to the high end of the red-line range on a tachometer may be 7,000 revolutions per minute (RPM). As the amount of alcohol, such as ethanol, in the fuel increases, the hard speed limit is reduced, thus limiting the upper maximum permitted engine speed for larger percentages of ethanol in the fuel (e.g., E85). For example, for E85 fuel, the maximum permitted engine speed may be 6,500 RPM, which is at the low end of the red-line range.

At 316 of routine 300, the actual engine speed is determined. If the engine speed is less than the maximum permitted engine speed, fuel injection is permitted without intervention. If, however, the engine speed is greater than the maximum permitted engine speed, fuel injection is cut in at least one cylinder at 318. Fuel injection may be cut in any number of cylinders. For example, in some embodiments, fuel injection may be cut in all cylinders. In other embodiments, fuel injection may be cut in only half of the cylinders. By stopping the injection of fuel to one or more cylinders, the engine is prevented from reaching a speed which may cause degradation of parts of the engine, such as the main engine bearings.

Figure 4:
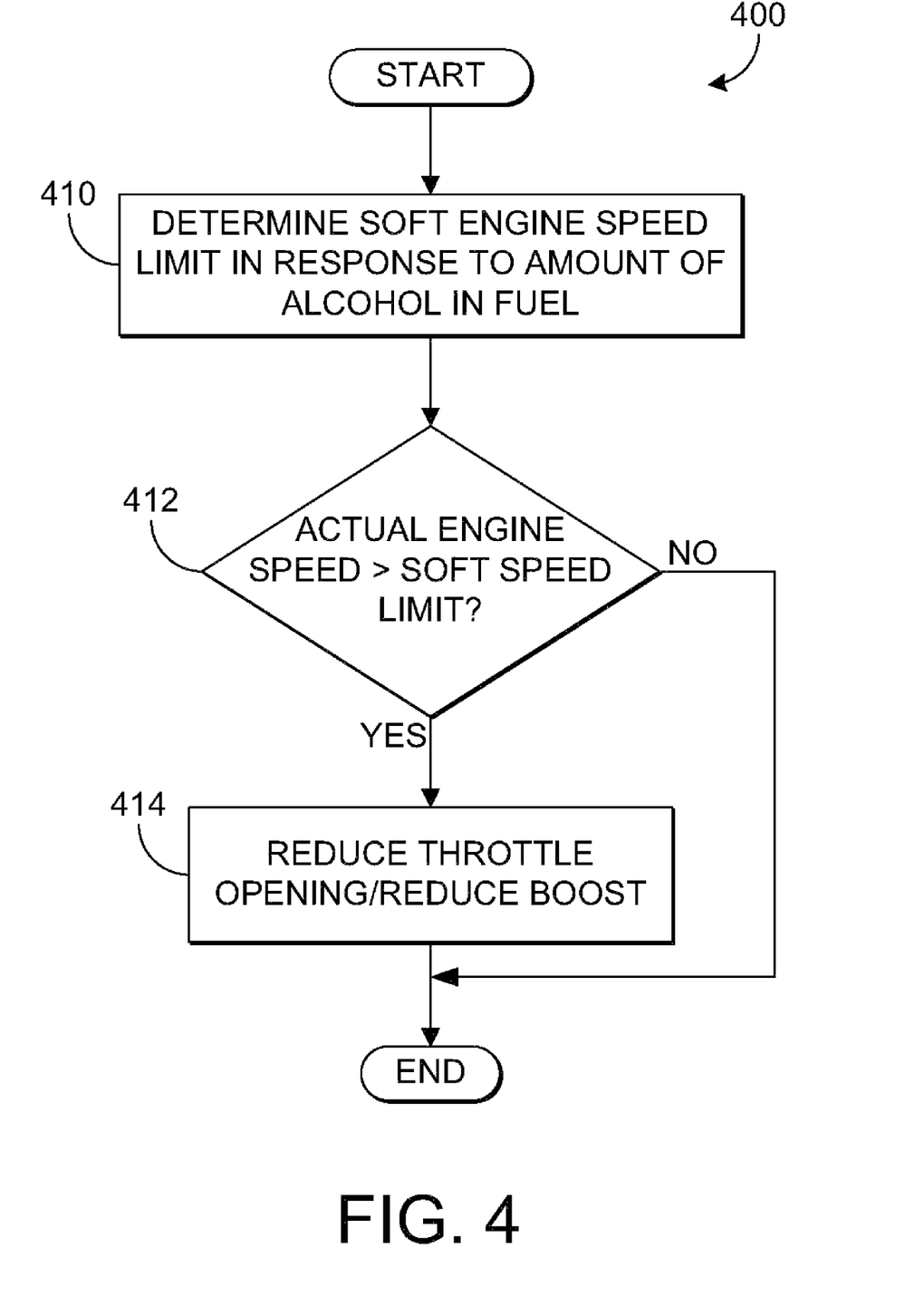
FIG. 4 is a flow chart illustrating an engine control system routine for a soft speed limit.

In addition to a hard speed limit, an engine may have another, less strictly enforced, speed limit, referred to as a "soft" speed limit, which is lower than the hard speed limit. The flow chart in FIG. 4 illustrates a control system routine 400 for a soft speed limit of the engine which may run in parallel with the routine of FIG. 3. Specifically, the procedure determines the soft speed limit of the engine based on an amount of alcohol contained in the fuel and accordingly adjusts the throttle opening and/or boost depending on the speed limit of the engine. In this manner, during most conditions, the engine speed is controlled before it reaches the upper maximum speed at which fuel injection is cut in one or more cylinders of the engine.

At 410 of routine 400, a soft speed limit of the engine is determined. The soft engine speed limit, which is also dependent on the amount of alcohol in the fuel, is less than the upper maximum permitted engine speed. For example, in an engine operating with a fuel containing 100% gasoline, the soft speed limit corresponding to the beginning of the red-line range on the tachometer may be 6,000 RPM. As the amount of alcohol, such as ethanol, in the fuel increases, the soft speed limit is reduced, thus limiting the engine speed for larger percentages of ethanol in the fuel (e.g., E85).

At 412, the actual engine speed is determined. If the engine speed is less than the soft speed limit, engine operation continues without intervention. If the engine speed is greater than the soft speed limit of the engine, however, the throttle opening and/or boost is reduced at 414 of routine 400. By reducing the throttle opening, and thus adjusting the airflow to the cylinders, the speed of the engine is controlled before it reaches a speed which may cause degradation to parts of the engine, such as the main bearings.

One or both routines 300 and 400 may be utilized to control the engine speed of a motor vehicle. In some embodiments, the use of the throttle, as described above, may be employed as a first method to control the speed of an engine that may operate with various concentrations of alcohol in the fuel. Adjustment of airflow via the throttle may cause less disruption in the operation of a vehicle than cutting fuel injection in one or more cylinders; therefore, throttle control may be a primarily relied upon for limiting engine speed. If the softer method is unable to accurately control the speed of the engine, however, the absolute method of cutting fuel injection may be used as a second method to control the speed of the engine.

As the speed limit of the engine is changed with the amount of alcohol in the fuel, transmission shifting points (e.g., a shift schedule) of an automatic transmission having a plurality of gear ratios coupled in the vehicle may also change in order to maintain the horsepower and/or driveability of the vehicle. Further, the shift schedule may also be adjusted to result in less frequent operation at high engine speeds, as discussed herein. The shift schedule of an automatic transmission determines when the gears are shifted (e.g., an up-shift to a higher gear or a down-shift to a lower gear) responsive to various operating conditions such as vehicle speed (VS) and pedal position (PP).

Figure 5:
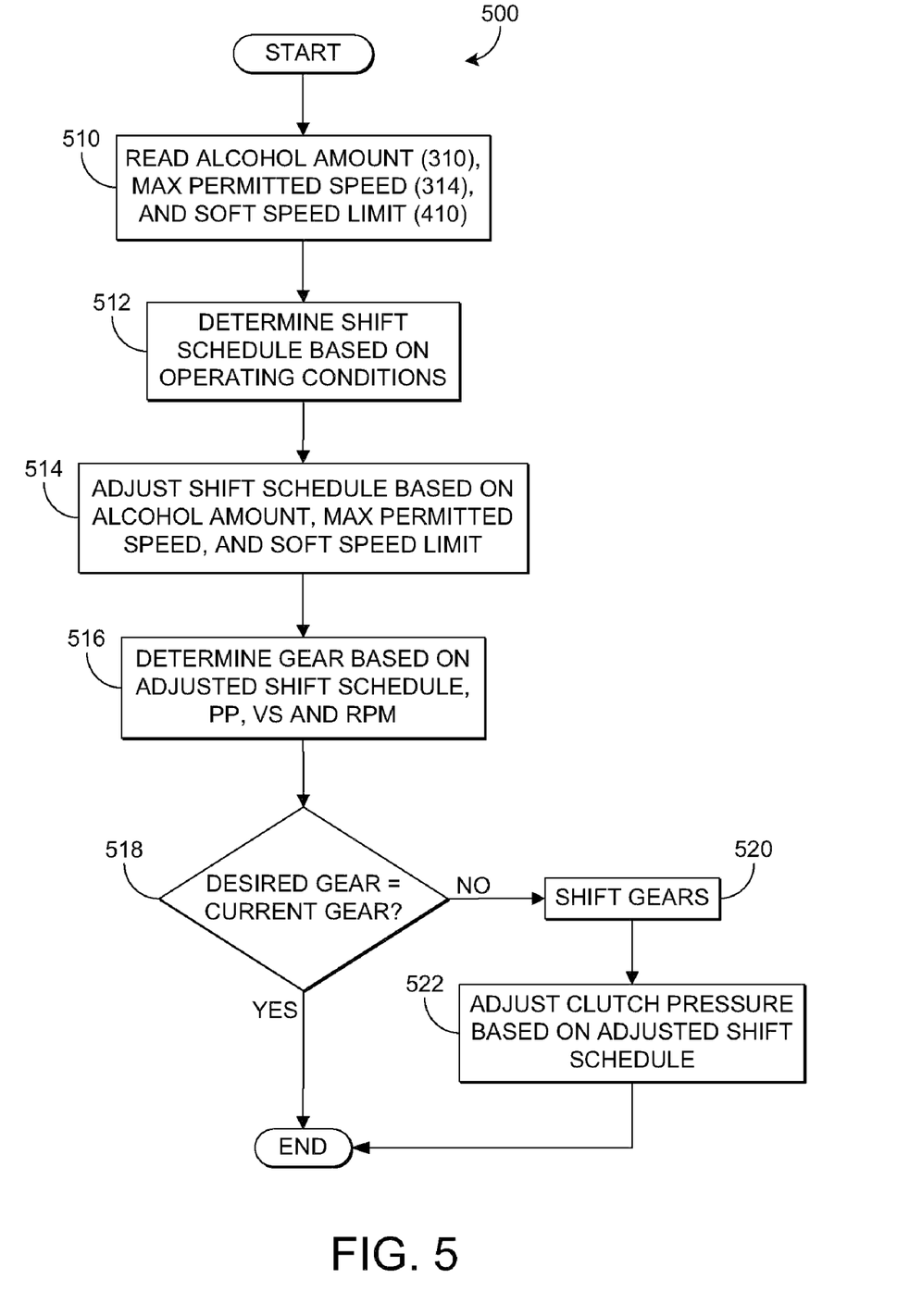
FIG. 5 is a flow chart illustrating a procedure for adjusting a shift schedule.

FIG. 5 shows a flow chart illustrating a routine 500 for adjusting the shift schedule of an automatic transmission. Specifically, the procedure determines a shift schedule responsive to conditions based on an amount of alcohol in the fuel, engine speed, VS, and PP, and accordingly adjusts the shift schedule and transmission clutch pressures depending on the adjusted speed limits of the engine. By adjusting the shift schedule, the chance the engine speed limit will be reached prior to execution of the shift is decreased, and further less frequent operation at higher engine speeds with high alcohol fuels may be achieved.

At 510, several parameters including the amount of alcohol in the fuel, maximum permitted engine speed (from 314 of FIG. 3), and soft speed limit of the engine are measured (from 410 of FIG. 4). As described above, the hard and soft speed limits of an internal combustion engine are dependent on the amount of alcohol in the fuel. The higher the concentration of alcohol in the fuel, the lower the speed limits of the engine in order to reduce fatigue of the main engine bearings.

Next, the shift schedule of the transmission is determined based on the operating conditions of the engine, such as temperature and other factors at 512 of procedure 500. The shift schedule is determined so that the engine speed is within a range for increased engine performance, such operation range being somewhere below the red-line range displayed on the tachometer.

At 514 of routine 500, the shift schedule is adjusted based on the amount of alcohol in the fuel, the maximum permitted upper speed of the engine, and the soft speed limit of the engine. For example, during at least one condition in which the amount of alcohol in the fuel is increased, the transmission operates to shift to a higher gear (e.g., from second gear to third gear) earlier than determined by the shift schedule in step 512. In this way, the performance of the engine may be maintained without damaging parts of the engine, such as the main bearings, as may occur with large amounts of alcohol in the fuel (e.g., E85). The shift points may be adjusted for any number of gears up to the total number of gears contained in the automatic transmission; thus, one, several, or all shift points may be modified responsive to the percentage of alcohol in the fuel.

Once the shift schedule is determined at 514, an appropriate gear may be determined at 516. The gear is determined based on current operating conditions such as the adjusted shift schedule, PP, VS and engine speed.

At 518 of routine 500, it is determined if the current gear is the same as the desired gear from 516. If the current gear matches the desired gear, transmission continues operation without changing gears. If the current gear is different from the desired gear, the gear may be shifted up or down depending on operating conditions as described above. For example, an adjustment of the shift schedule due to a high amount of alcohol in the fuel may result in an up-shift to a higher gear at a lower RPM for a given VS and PP.

As the shift schedule of the automatic transmission changes, the clutch pressures may also be changed. Therefore, responsive to the adjusted shift schedule and subsequent change of gears, the transmission clutch pressure is adjusted at 522 of routine 500 in FIG. 5 responsive to the determined speed limits (hard and soft) as well as the amount of alcohol in the fuel stored in the fuel tank and/or delivered to the engine. For example, during a shift to a higher gear at a lower RPM in response to a higher amount of alcohol in the fuel, transmission clutch pressures may be increased to achieve and/or maintain the shift.

Figure 6:
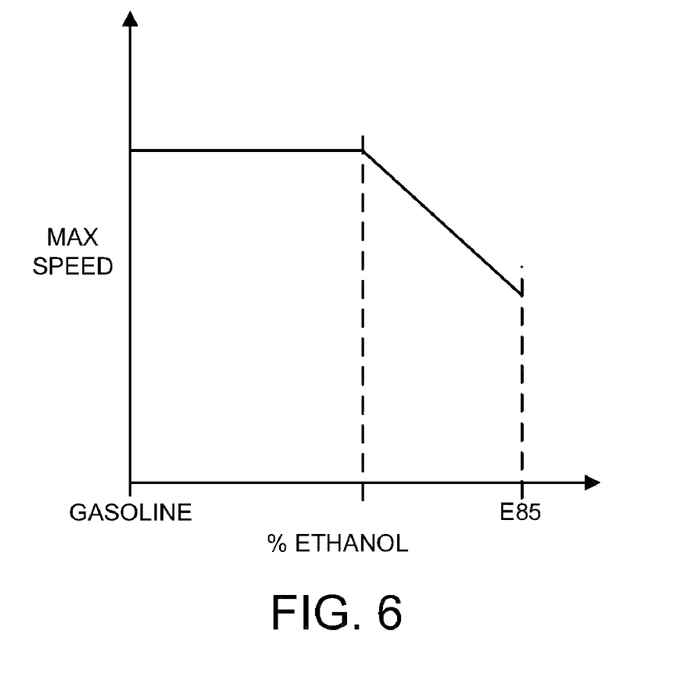
FIG. 6 an example map of maximum engine speed based on an amount of ethanol in the fuel.

A further example of the affect the amount of alcohol (e.g., ethanol) in the fuel has on the engine speed is displayed in FIG. 6. The map in FIG. 6 shows the maximum engine speed based on the amount of alcohol in the fuel. The maximum speed of the engine may be maintained from fuel containing 100% gasoline through a threshold percentage of ethanol. Once the threshold percentage of ethanol is crossed, the maximum permitted speed of the engine is reduced.

As the maximum permitted speed of the engine is reduced responsive to the amount of alcohol in the fuel, the shift points of the transmission may also be adjusted as noted herein. Thus, during at least one condition, for example, the adjusting of shift points includes shifting earlier to a higher gear in response to the reduced maximum engine speed to reduce intervention of the fuel cut operation.

Figure 7:
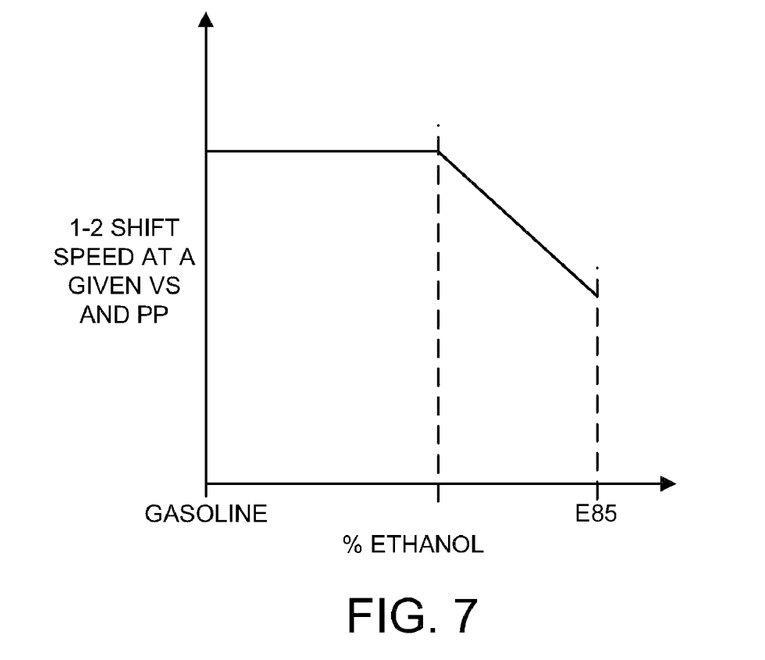
FIG. 7 shows an example map of the shift speed between first and second gears based on an amount of ethanol in the fuel.

As another example, the map in FIG. 7 shows the speed at which a transmission switches from first gear to second gear based on the amount of alcohol (e.g., ethanol) in the fuel. Between a fuel containing 100% gasoline and a threshold percentage of ethanol, the speed at which the transmission is switched from first to second gear remains steady. With an increase in the amount of ethanol from the threshold percentage, the 1-2 shift speed begins to decrease. Although the 1-2 shift speed is depicted in the graph of FIG. 7, the general trend of the graph may apply to the up-shift between any gear to the next higher gear of the transmission (e.g., 2-3, 3-4, etc.).

Additionally, the down-shifts of the transmission may be affected by the amount of alcohol in the fuel. For example, the driver of a vehicle traveling on a highway at 60 miles per hour in fifth gear may wish to accelerate; therefore, the driver may increase the depression of the pedal from 30% to 50%. If the vehicle is operating with a fuel of 100% gasoline, the threshold for down-shifting to increase engine speed, and wheel torque, may be at a pedal depression of 45%. If the vehicle is operating with a high-alcohol fuel, such as E85, the threshold for downshifting may be at a pedal depression of 55%. Thus, for an engine operating with a high percentage of alcohol in the fuel, the transmission may shift to a lower gear later in order to reduce operation at high engine speeds with high alcohol fuels, as well as to reduce intervention of the reduced engine speed (hard and/or soft) limits.

Via the above-described techniques, vehicles configured to operate on various fuel blends (e.g., gasoline with varying levels of ethanol) may have a decreased possibility of engine degradation, such as main bearing fatigue. By limiting the speed of the engine responsive to the amount of alcohol in the fuel and subsequently adjusting the shift points of the transmission, the control system effectively addresses the issue of engine wear.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for operating an engine in a vehicle, the method comprising:
   delivering fuel to the engine, the fuel having a varying alcohol amount; and
   limiting engine speed during vehicle operation to a maximum permitted engine speed, the maximum permitted engine speed responsive to the amount of alcohol.

2. The method of claim 1 where amount of alcohol is a percent ethanol.

3. The method of claim 1 where the maximum permitted engine speed is reduced as the amount of alcohol increases.

4. The method of claim 3 wherein the limiting includes cutting fuel injection to cylinders of the engine.

5. The method of claim 3 wherein the maximum permitted engine speed is within a red-line range displayed to a driver on a tachometer of the vehicle.

6. The method of claim 1 further comprising adjusting shifting points of an automatic transmission coupled in the vehicle, the shifting points adjusted responsive to the amount of alcohol.

7. The method of claim 6 wherein the adjusting of shift points includes during at least one condition, shifting earlier to a higher gear in response to a higher alcohol amount.

8. The method of claim 6 wherein the adjusting of shift points includes during at least one condition, shifting later to a lower gear in response to a higher alcohol amount.

9. The method of claim 7 further comprising adjusting a transmission clutch pressure responsive to the amount of alcohol.

10. The method of claim 9 wherein the adjusting of the transmission clutch pressure includes increasing a clutch pressure during the shift to the higher gear in response to the higher alcohol amount.

11. A method for operating an engine in a vehicle, the method comprising:
    delivering fuel to the engine, the fuel having a varying alcohol amount;
    limiting engine speed during vehicle operation to a first permitted engine speed, the first permitted engine speed responsive to the amount of alcohol in the fuel; and
    limiting engine speed during vehicle operation to a second permitted engine speed, the second permitted engine speed being greater than the first permitted engine speed and responsive to the amount of alcohol in the fuel.

12. The method of claim 11 where the amount of alcohol is a percent ethanol.

13. The method of claim 11 where the first permitted engine speed is reduced as the amount of alcohol increases.

14. The method of claim 11 where the second permitted engine speed is reduced as the amount of alcohol increases.

15. The method of claim 13 wherein the speed limiting includes adjusting a throttle to control airflow to cylinders of the engine.

16. The method of claim 11 further comprising adjusting shifting points of an automatic transmission coupled in the vehicle, the shifting points adjusted responsive to the amount of alcohol.

17. The method of claim 16 wherein the adjusting of shift points includes during at least one condition, shifting earlier to a higher gear in response to a higher alcohol amount.

18. The method of claim 16 wherein the adjusting of shift points includes during at least one condition, shifting later to a lower gear in response to a higher alcohol amount.

19. The method of claim 17 further comprising adjusting a transmission clutch pressure responsive to the amount of alcohol, wherein the adjusting of the transmission clutch pressure includes increasing a clutch pressure during the shift to the higher gear in response to the higher alcohol amount.

20. A system for an engine in a vehicle, the system comprising:
    an automatic transmission having a plurality of gear ratios;
    the engine coupled to the transmission via a torque converter;
    a control system configured to deliver fuel to the engine, the fuel having a varying alcohol amount; limit engine speed during vehicle operation to a first permitted engine speed responsive to the amount of alcohol; limit engine speed during vehicle operation to a second permitted engine speed, the second permitted engine speed being greater than the first permitted engine speed and responsive to the amount of alcohol; and adjusting selection of the gear ratios responsive to the amount of alcohol.

* * * * *